US008458592B2

(12) United States Patent
Farrington et al.

(10) Patent No.: US 8,458,592 B2
(45) Date of Patent: Jun. 4, 2013

(54) APPARATUS, SYSTEM, AND METHOD FOR CONTEXTUAL VISUAL SEARCH

(75) Inventors: Shannon M. Farrington, Gilroy, CA (US); Alexander D. Robinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/184,964

(22) Filed: Aug. 1, 2008

(65) Prior Publication Data
US 2010/0031144 A1 Feb. 4, 2010

(51) Int. Cl.
*G06F 3/00* (2006.01)

(52) U.S. Cl.
USPC ............ 715/712; 715/705; 715/708; 715/709

(58) Field of Classification Search
USPC .......................... 715/705, 708–709, 711–712
See application file for complete search history.

(56) References Cited

U.S. PATENT DOCUMENTS

| 5,155,806 | A | | 10/1992 | Hoeber et al. | |
|---|---|---|---|---|---|
| 5,933,140 | A | | 8/1999 | Strahorn et al. | |
| 5,974,572 | A | * | 10/1999 | Weinberg et al. | 714/47.2 |
| 5,995,101 | A | * | 11/1999 | Clark et al. | 715/711 |
| 6,976,067 | B2 | | 12/2005 | Gusler et al. | |
| 7,000,187 | B2 | | 2/2006 | Messinger et al. | |
| 7,797,642 | B1 | * | 9/2010 | Karam et al. | 715/810 |
| 2004/0268258 | A1 | | 12/2004 | Lee et al. | |
| 2006/0080321 | A1 | * | 4/2006 | Horn et al. | 707/10 |

* cited by examiner

*Primary Examiner* — Weilun Lo
*Assistant Examiner* — Truc Chuong
(74) *Attorney, Agent, or Firm* — Kunzler Law Group, PC

(57) ABSTRACT

Disclosed are an apparatus, system, and method for visual contextual searching in a computer application that has a graphical user interface (GUI). The apparatus includes a selection module that defines a selection area of the GUI that is displayed on the computer display. The user provides the necessary input defining the selection area using an input device such as a mouse to define the boundary of the selection area. A topic module determines a set of topics related to the GUI elements that are displayed within the selection area defined by the user. The topic module may make the association using a visual map. A display module then displays these results for the user in a results section that is shown on the display. The apparatus may apply filter rules to restrict the number and types of topics that the display module lists. Users may also associate topics with a particular GUI element or disassociate topics with a particular GUI element.

23 Claims, 7 Drawing Sheets

APPARATUS, SYSTEM, AND METHOD FOR CONTEXTUAL VISUAL SEARCH

BACKGROUND OF THE INVENTION

1. Field of the Invention

The invention relates to an improved approach to searching for information in a visual computing environment, such as a computer application with a graphical user interface (GUI).

2. Description of the Related Art

Most modern computer applications have a graphical user interface (GUI) that allows the application user to easily and intuitively interact with the application. Instead of requiring the user to enter text commands in a text-based interface (such as DOS), the user simply clicks on a graphical GUI element (such as icons, visual indicators, or widgets) to provide instructions to the application. For example, a word processing program provides GUI elements such as a "save" button and an "underline" button. To save the document, the user need only click on the save button. Allowing the user to interact with the application through the GUI makes using the application simpler.

Computer applications have grown increasingly complex, and provide the user with a wide range of tools. To help the user use the program and its associated tools, computer applications generally provide a help topic index. The help feature is often organized as a text-based search. If the user wants to learn how to save, for example, and become familiar with different save options, the user enters the term "save" as a search term in a help screen. The computer application then looks up entries associated with the term "save" and provides information about the save button and its associated functionality.

A limitation of this traditional system is that the user needs to know the name of an appropriate keyword in order to enter it into the help screen search or to look it up in a table of contents. If the user does not know the proper keyword, the help feature may not return expected or useful results. Given the increasing complexity of computer applications, it is not uncommon for a user to see a tool, GUI element, or feature that she is unfamiliar with. In addition, features that are common across different applications may have different names; for example, one program may provide a tool or GUI element called "margins" for adjusting margins on a page, while another may provide the same functionality but call the tool "borders."

SUMMARY OF THE INVENTION

The present invention has been developed in response to the present state of the art, and in particular, in response to the need for a visual contextual search that does not require the user to know the names of GUI elements in order to retrieve information concerning how to use them.

In one embodiment, the invention is realized as a computer program product for visual contextual searching. The computer program product includes a selection module that defines a selection area of the computer application GUI displayed on a computer display when it receives selection area parameters that define a boundary of the selection area from a user. The computer program product also includes a topic module that determines a set of topics that is related to one or more GUI elements that are displayed within the selection area defined by the user. A display module displays for the user, on the computer display, a results section that includes one or more topics of the set of topics associated with the selection area defined by the user.

In certain embodiments, the computer program product also includes a visual map of the GUI. The visual map defines an association between one or more topics and the GUI elements. The topic module determines the set of relevant topics by identifying the topics associated with those GUI elements that are located in a portion of the visual map corresponding to the selection area.

The computer program product also includes a context module that determines which of the topics are actually displayed in the results section based on membership in the set of topics and filter rules. The topics that are displayed may be names, links, or actual topic descriptions.

A modification module associates topics with an area of the GUI if the user adds topics to the results section, and may disassociate topics with an area of the GUI if the user removes topics from the results section. A save module saves the topics displayed in the results section as a list in non-volatile memory and allows the user to access these saved lists in later sessions. The modules of the computer program product can be realized in a computer application such as an internet browser or a computer software application. The modules may be plug-ins that are incorporated into one or more compliant computer software applications.

Also disclosed is a computer-implemented method to enable visual contextual search. The method includes defining a selection area of a GUI in response to receiving selection area parameters from a user, determining those topics that are related to GUI elements within the selection area, and displaying a results section that includes one or more of the topics in the set that are associated with those GUI elements within the selection area. Instructions for implementing the method, and others, may be received from a remote server and instantiated in the local memory of the computer executing the instructions.

A system for visual contextual search is also disclosed. The system includes a computer application with a GUI displayed for a user on a computer display. This computer application may operate on a server, a desktop computer, or a mainframe computer. The system also includes a visual map of the GUI that associates one or more topics with particular GUI elements of the GUI. Finally, a visual search component includes a selection module, topic module, and a display module as described above. The system may also include a modification module and save module. The user may provide input to the system using a mouse, a touch screen tool, or a keyboard.

The visual context search component may also include an update module that receives over a network a new topic related to the program and one or more locations in the visual map for the new topic. The update module may also send a topic and information associating the topic to particular GUI elements to a remote server in response to the modification module associating the topic with the area of the GUI. In particular embodiments, topics disassociated with an area of the GUI are removed only locally.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
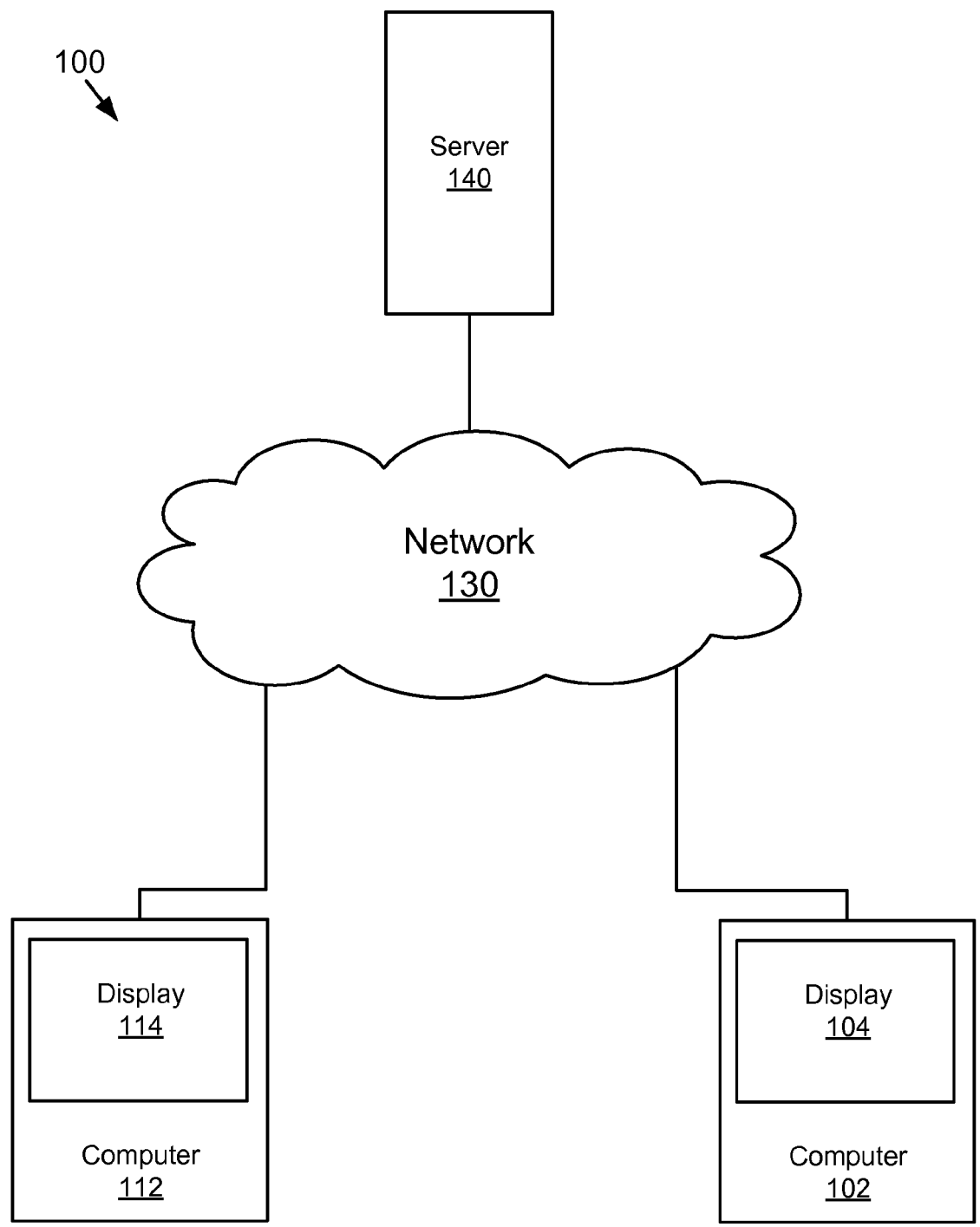
FIG. 1 is a schematic block diagram illustrating a system in which visual contextual search can be implemented.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where the modules comprise executable code, they are stored on computer readable storage media such as CDs, tape, hard drives, and other forms of computer readable media known to those in the art.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates one embodiment of a system 100 in which visual contextual search may be utilized. The system 100 includes a computer 102, a computer 112, and a server 140, all of which are connected by a network 130. In one embodiment, the computers 112 and 102 are desktop computers. The computers 112 and 102 have displays 114 and 104, and may also include memory and a processor. In one embodiment, the computer application runs on the computer 112 and 102 and the GUI is shown on the display 114 and 104. In such an embodiment, the instructions and data for the computer application are stored in memory and are executed by the processor. The computer 112 and 102 also typically provide the user with input devices such as a mouse and a keyboard. A computer 112 and 102 may also be a touch screen computer responsive to human touch or a touch screen device such as a stylus.

The computers 112 and 102 are connected to a network 130. The network 130 may be a large area network (LAN), or a wide area network (WAN) such as the internet. The computer 112, computer 102, and the server 140 can communicate via the network 130. For example, the computer 102 may download computer instructions from the server 140 and instantiate them locally. In one embodiment, the computer 102 has local storage such as a hard drive, and instructions downloaded from the server 140 are instantiated onto the hard drive. Those of skill in the art will appreciate that the instructions may be stored in any number of computer readable storage media. In an alternative embodiment, the server 140 is a mainframe computer and the computers 112 and 102 are thin clients.

Instantiation may also include direct copying of object code from the server 140 to the computer 102, or may simply involve the creation of object code through compilation. Thus, the source may be delivered from the server 140 to the computer 102, which then compiles the source code locally. Those of skill in the art will appreciate that a variety of approaches may be taken to delivering software from a server 140 to a computer 102 over a network 130. The described process of instantiation is not limited to any particular approach to electronic software distribution.

Figure 2:
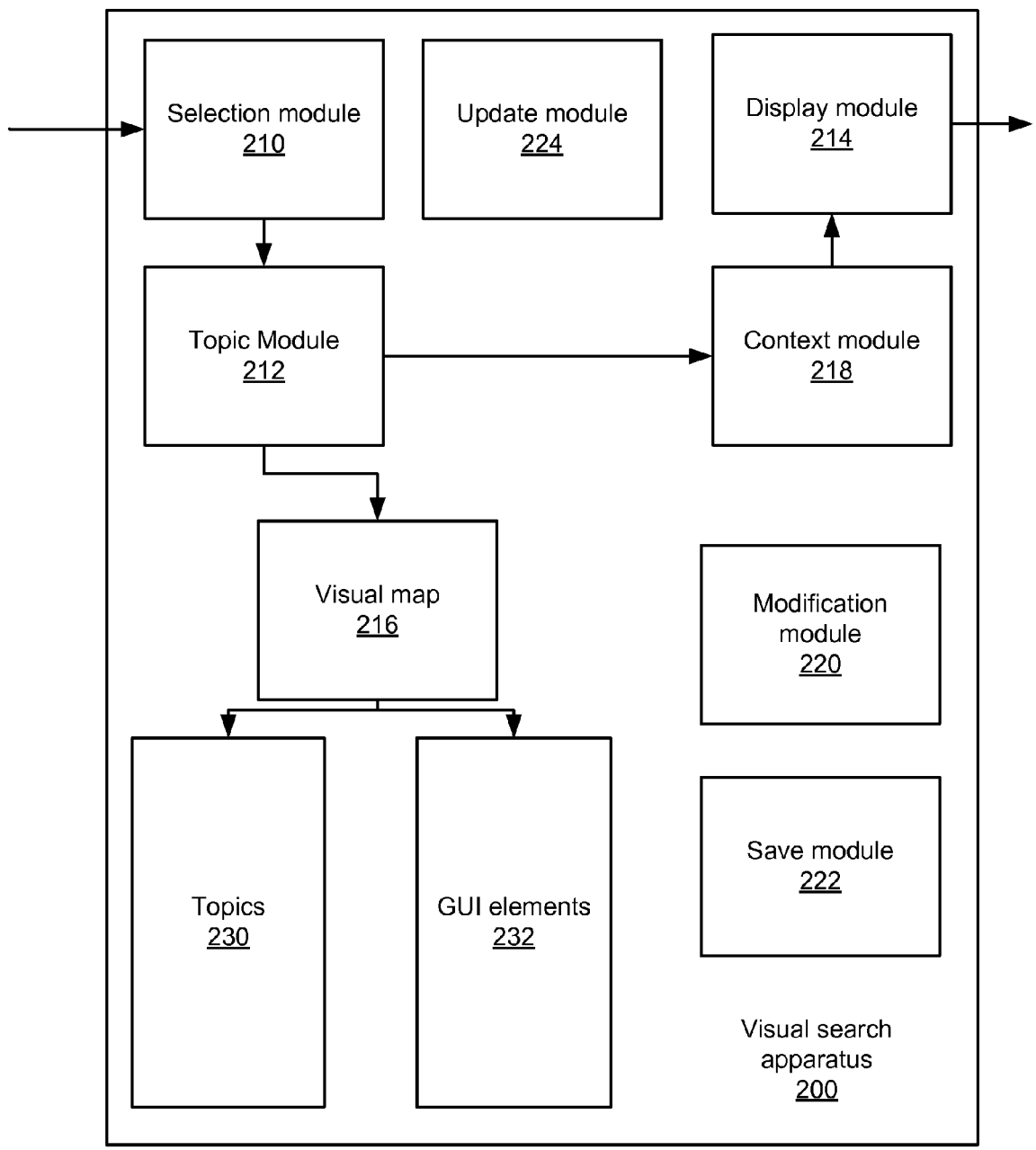
FIG. 2 is a schematic block diagram illustrating one embodiment of a visual search apparatus in accordance with the present invention.

FIG. 2 is a schematic block diagram showing one embodiment of a visual search apparatus 200 in accordance with the present invention. In the depicted embodiment, the visual search apparatus 200 includes a selection module 210, a topic module 212, and a display module 214. The visual search apparatus 200 may further include a visual map 216, topics 230, GUI elements 232, a context module 218, a modification module 220, a save module 222, and an update module 224. In one embodiment, the visual search apparatus 200 is realized as a computer program product that includes executable instructions stored in computer readable media.

The selection module 210 is configured to define a selection area of the computer application GUI that is displayed on the display 104. The user provides the selection module 210 with selection area parameters that define the boundary of the selection area. The user may provide the selection module 210 with these parameters using a computer input device such as a keyboard, a mouse, or a touch screen. For example, the user may use a mouse to draw a box around a portion of the screen. The selection module 210 receives parameters defining this box as its input. The selection module 210 then defines the selection area to have the location and area specified by the user.

In one embodiment, the computer application provides the user with the tools that are necessary for enabling contextual visual search as described in this application. For example, the computer application may have a selection area tool as part of the GUI; thus, the user can simply click the selection area tool and draw a shape encompassing the relevant portions of the GUI about which the user wants information. Clicking the selection area tool and drawing a shape signals to the selection module 210 that the user is purposefully defining a selection area and wants information on topics related to that selection area. In an alternative embodiment, the user may simply enter a coordinate set using a keyboard to define the selection area; for example, the user may enter in the coordinates for four corners or two opposite corners of a selection area. The selection module 210 can use these four points or two points to define the selection area by, for example, joining them with straight lines. In typical embodiments, the GUI will provide the user with a tool to perform a visual contextual search as outlined in this application. The GUI may additionally allow the user to access this functionality through a short-cut key.

The visual search apparatus 200 also includes a topic module 212. The topic module 212 determines a set of topics that are related to those GUI elements that are within the selection area that the user defines. For example, if the user selects a GUI element entitled "layout," the topic module may determine that the topics "layout," "paragraphs," "margins," and "columns" are associated with the layout GUI element. These four topics would make up the set. In one embodiment, if the user selects multiple GUI elements, the topic module 212 retrieves all of the topics that are related to any of the GUI elements within the selection area provided by the user.

The display module 214 displays on the computer display (such as the display 104) a results section. The results section can include all of the topics associated with the GUI elements within the selection area, or it may only include a subset of those topics, as discussed below. The results section presents the user with those topics that are relevant to the area of the GUI that she selected.

In one embodiment, the results section is populated dynamically; that is, as the user adjusts the size and shape of the selection area, the topic module 212 determines on the fly those topics that are encompassed by the changing selection area. As the selection area grows or shrinks, the topics listed in the results section change accordingly. In an alternative embodiment, the results section is populated only once the user finalizes the selection area.

Thus, the user does not need to know the name of any particular tool or GUI element in order to access information on what it is and how to use it. The user can simply define the area of the display in which the GUI element is shown, and the display module presents those topics that are relevant to the particular area.

In one embodiment, the topic module 212 determines what topics are associated with the selection area by using a visual map 216 of the GUI. In one embodiment, the visual map 216 of the GUI defines an association between the topics 230 and the GUI elements 232. The visual map 216 is used by the topic module 212 to determine which GUI elements are in the selection area that the user has specified. The topic module 212 then retrieves all topics 230 that are associated with those GUI elements 232. In an alternative embodiment, the visual map 216 associates the topics 230 with areas of the GUI independent of the GUI elements 232. Thus, the topic "open" may be associated with an area that starts at the right and top of the display 104 and extends to the left 20 pixels and down 20 pixels.

Thus, in one embodiment, the visual map 216 tracks the location of a particular GUI element 232 on the display 104. If the topic module 212 determines that the selection area encompasses the GUI element 232, it finds the topics 230 associated with that particular GUI element 232. This approach may be particularly useful where the location of the GUI elements 232 on the display 104 is variable. For example, a user may reconfigure a toolbar and add or remove GUI elements 232 such as buttons. In addition, resizing a window may change the location of GUI elements 232 on the display 104. Alternatively, the visual map 216 may simply associate the topics 230 with coordinates for the GUI in the display 104. In such an embodiment, the topics 230 are tied to the coordinates, not a particular GUI element. In other embodiments, the topic module 212 may utilize multiple visual maps 216 to determine associated topics 230, where each visual map 216 is implemented differently. For example, one visual map 216 might associate topics 230 with GUI elements 232 while a separate map associates topics 230 with coordinates of the GUI. The unique results of both maps may then be displayed to the user.

The topics 230 presented to the user may take many forms. The topic 230 may be a detailed description explaining a particular feature. The topic 230 may be a name, or a hyperlink to a detailed description of the feature. The link may lead to a text description, a multimedia description or tutorial (such as audio or video), or other useful resource. A topic 230 may be information, or a link to information, that is helpful to the computer application's user.

In one embodiment, the visual search apparatus 200 also includes a context module 218 that determines which of the topics 230 to display to the user via the display module 214. As discussed above, for a particular selection area, there is an associated set of topics 230. The set may be empty, or may alternatively include a large number of topics 230. For example, a toolbar that includes eight different GUI elements 232 would likely have many topics 230 associated with it. If the user selects the entire toolbar, the set may include the topics 230 for each individual GUI element 232 as well as the toolbar GUI element 232.

The context module 218 determines which of the topics 230 to display to the user based on membership in the set of topics 230 and at least one filter rule. To continue the example above, the context module 218 may have a filter rule specifying that, where the GUI elements 232 are a subset of a larger GUI element 232 (such as the toolbar), only the topics for the larger GUI element 232 should be displayed. In an alternative embodiment, the context module 218 has a filter rule that specifies that in this situation only high level topics 230 associated with the GUI elements 232 that make up the toolbar should be displayed, while all topics 230 associated with the toolbar GUI element 232 should be displayed in the results section.

Those of skill in the art will appreciate that the example described above is simply descriptive of possible implementations of the context module 218. Generally, the context module 218 determines which topics 230 are displayed in the results section based on membership in the set of relevant topics 230 and one or more filter rules. The context module 218 may further change the order of presentation based on membership and filter rules in order to present what are likely the most important results first.

The visual search apparatus 200 may also include a modification module 220 that associates and disassociates topics 230 with an area of the GUI or with GUI elements 233 based on user input. For example, the user may define a selection area and, in response, the display module 214 presents the topics 230 in a results section as described above. Upon reviewing the topics 230 in the results section, the user determines that two topics 230 that are listed are superfluous. The user is also aware of two resources (for example, a web page and a video) that are relevant to the selection area.

Using the modification module 220, the user can add or remove topics 230 from the results section on the computer display and also from the list of topics 230 referenced by the visual map 216. In one embodiment, the user selects the two superfluous topics and deletes them. The modification module 220 makes note of this removal and adjusts the list of topics 230 in the visual search apparatus 200 accordingly. In addition, the user adds the video to the results section. The user may do so by performing a drag and drop operation, providing a URL, or other means for adding a resource known to those of skill in the art. In response, the modification module 230 adds this new resource to the topics 230 and associates the resource with the selection area.

The modification module 220 may also request additional information from the user in order to more specifically make an association between the newly added resource and the GUI. In one embodiment, the modification module 220 simply associates the topic 230 with the coordinates of the selection area. Thus, any future selection area that encompasses the selection area will have the newly added resource displayed as a topic 230 in the results section. Such an embodiment may have two visual maps 216 as discussed above: one provided to the user that associates GUI elements 232 and topics 230, and one that associates new topics 230 that are added by the user with coordinates of the GUI.

In an alternative embodiment, the modification module 220 may request more specific information of the user; for example, the modification module 220 may request the user to specify which GUI element 232 the newly added resource is associated with. Such an embodiment may be useful to provide more granular, specific, and relevant results in the future, or to facilitate sharing new resources with other users connected over a network as discussed below.

The visual search apparatus 200 may further include a save module 222 that saves the topics 230 that are displayed in the results section into non-volatile memory such as a disk drive, flash, or others known to those of skill in the art. The save module 222 allows the user to access the saved list at a later date. Thus, the user can build custom help lists and store them in non-volatile memory for later access. In one embodiment, the user can use the save module 222 and the modification module 220 to create custom help features and store them for later use. These custom lists can be exported to other computers or otherwise made available to other users over a network 130.

The visual search apparatus 200 also includes an update module 224. The update module allows communication of resources and information over a network 130. In one embodiment, the update module 224 receives new topics 230 related to the computer application along with the associated GUI elements 232 or locations.

Figure 3:
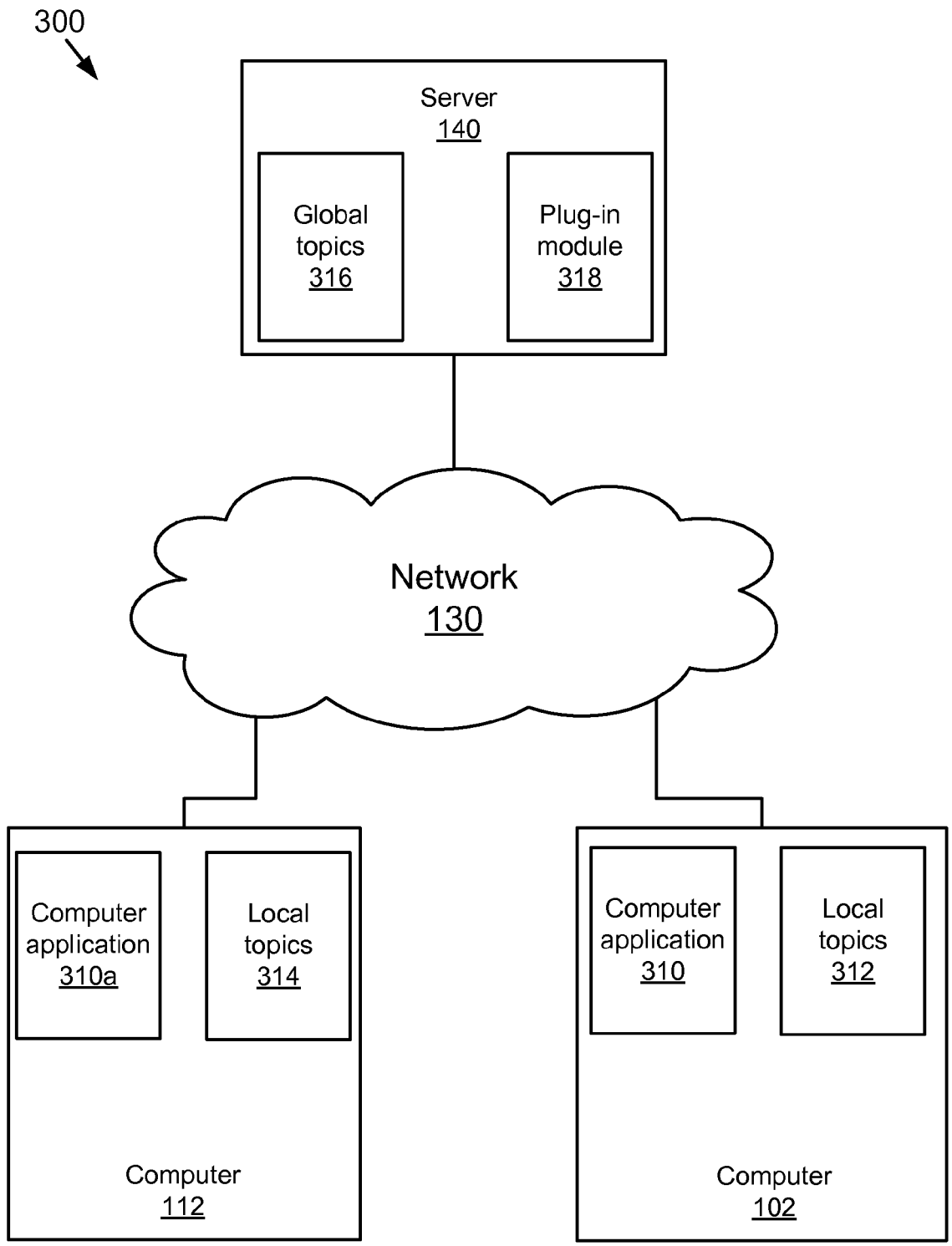
FIG. 3 is a schematic block diagram of a system implementing visual contextual search in accordance with the present invention.

FIG. 3 shows a system 300 in which the update module 224 may be utilized to enable a community to construct a help topic list. As in FIG. 1, the system 300 includes a server 140 connected to a computer 112 and a computer 102 through a network 130. FIG. 3 also shows the server 140 including a plug-in module 310 and global topics 316. Computer 112 includes a computer application 310a and local topics 314.

The computer application 310a is one that is compatible with the present invention. In one embodiment, as discussed above, the user of the computer 112 initiates a request over the network 130 to the server 140 for the necessary files and data to implement the visual search apparatus 200 in a compatible computer application. The server 140 delivers the necessary files stored in the plug-in module 318 to enable visual contextual search for the computer application 310a. The computer 112 instantiates the instructions on the computer 112 and the user can then visually search for and discover information regarding the computer application 310a. As part of the setup process, the computer 112 creates a list of local topics 314. In one embodiment, at the initial setup, the local topics 314 are equivalent to the contents of the global topics 316. Those of skill in the art will appreciate that while the present application makes reference to a "list" of topics, the data structure for storing topics is not limited to a list structure. Other structures and approaches for storing topics known to those in the art can be used without departing from the essence of the present invention.

A separate user goes through a similar process to configure the computer 102 to install a plug-in that enables contextual visual search. In one embodiment, when a user associates a new resource with a selection area of the computer application 310 using the modification module 220, the update module 224 sends the newly added resource and information regarding its association with the computer application 310 GUI to the server 140 for inclusion in the global topics 316. For example, if the user adds a video showing how to create columns in a document and associates it with a "columns" GUI element, a link to the video or the video itself may be sent to the server 140. The video is then added to the global topics 316 and associated with the columns GUI element.

The update module 224 may further monitor the server 140 for changes to the global topics 316. Thus, when the user adds the new resource as a topic 230 for the computer application 310, and the necessary information is transmitted to the server 140, the server 140 provides this new topic to the computer 112. Those of skill in the art will appreciate that changes may be pushed to clients of the server 140, or the clients (such as computer 112 and 102) may poll the server 140 for changes at regular intervals. As a result, as users collectively add topics 230 to their individual computer applications 310, all users reap the benefit as the list of global topics 316 grows. In short, the community can add content to the help topics and build a community resource for information.

In one embodiment, if the user determines that a topic 230 is not helpful and removes it using the modification module 220, the topic is removed from the local topics 312 but not from the global topics 316. The user may also enable or disable the update module 224 and thus prevent the addition of new topics 230 to the local topics 312.

Figure 4:
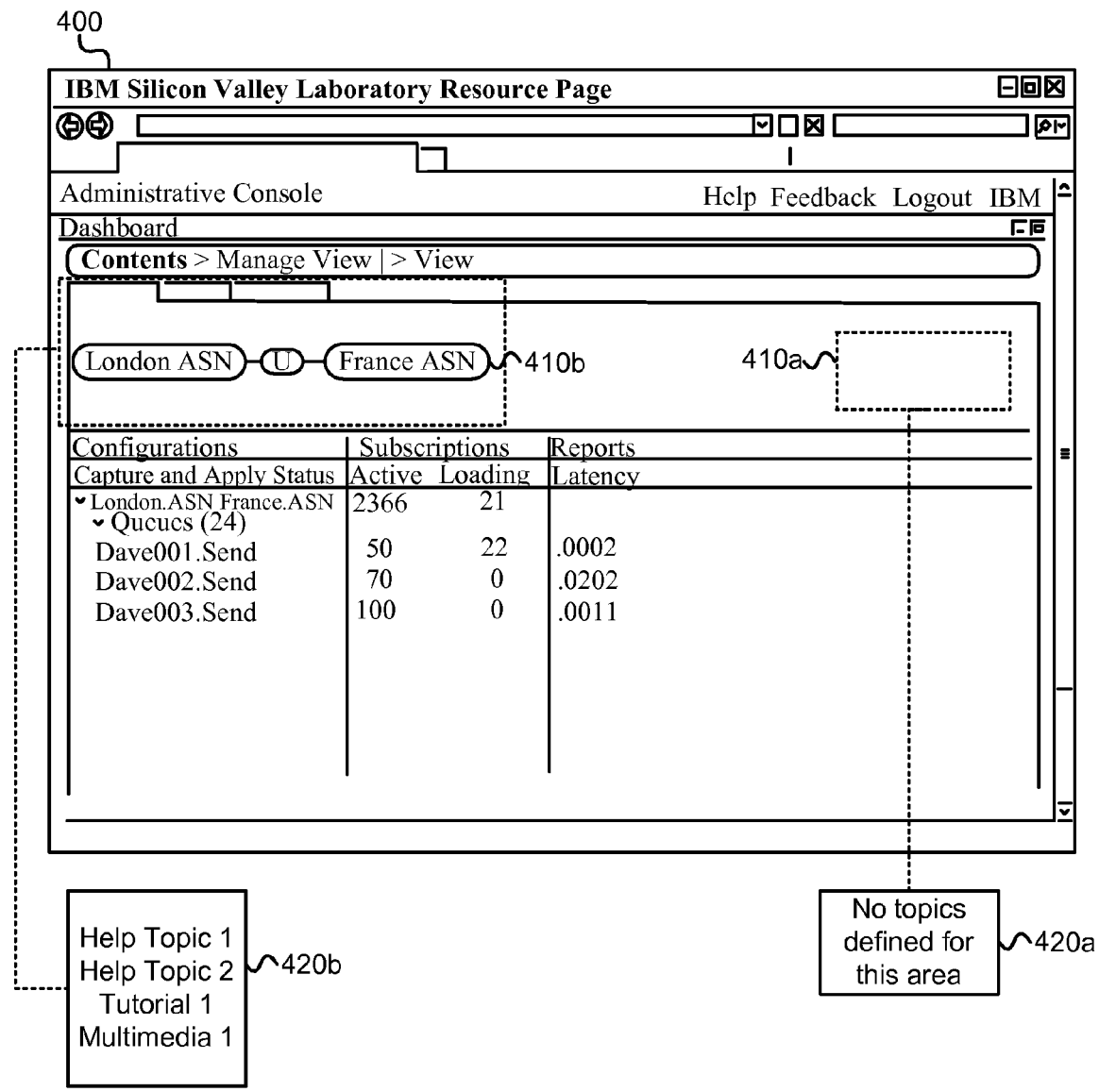
FIG. 4 is an example of a computer application having visual contextual search capability in accordance with the present invention.

FIG. 4 is an example of a computer application 400 for implementing the present invention. In the depicted embodiment, the computer application 400 is a web browser. In such an embodiment, the web browser 400 may be used to implement the GUI. The GUI elements in such an embodiment extend not only to the tools provided by the web browser 400 itself, but also the GUI elements that are presented within the browser as content. In such an embodiment, the topics may be tied to particular tags or references used to generate the content within the browser, such as (X)HTML, Javascript, and others known to those of skill in the art.

In the depicted embodiment, the user may use a selection tool provided by the web browser 400 or by the web application to define a selection area. The user, for example, may generate the selection area 410a using a mouse to draw the rectangle shown. In another embodiment, the user may enter the coordinates for the rectangle through a keyboard.

As described above, a display module 214 displays those topics associated with the selection area 410a in a results section 420a, as determined by the topic module 212. The results section 420a may display as a popup window, or the results section 420a may be a designated portion of the computer application 400 such as a sidebar. The topic module 212 may determine that no topics are associated with the selection area 410a (as shown) and report an empty set.

The user may instead define a selection area 410b having a number of associated topics. The display module 214 lists these topics in the results section 420b. As shown, the topics may be hyperlinks, tutorials, or multimedia explaining the use of the particular features within the selection area 410b. As shown, the selection area 410b encompasses the "Overview," "Tables," and "Live Graph" tabs. As such, the context module 218 may show only some of the related topics in the results section 420b, providing a more general picture of what these tabs mean and how the user can use them.

If the user is familiar with additional resources that would be helpful in understanding the "Overview" tab, she may add that resource to the list as a topic. In one embodiment, the user simply pastes the URL of the resource into the results section 420b and provides a descriptive name and explanatory tag. The user may alternatively upload the resource from the local computer to a server, as described in connection with FIG. 3.

FIG. 4 shows an alternative embodiment of the computer application 400 presenting the results of a contextual visual search in a results section 510. In the depicted embodiment, the user chooses the selection area 502 as described above. In response, the topics that are associated with the selection area appear in the results section 510. As discussed previously, the topics may appear in the results section 510 dynamically; that is, the list of topics may change dynamically as the user adjusts the size and shape of the selection area 502. This may be of particular use as it allows the user to monitor the topics placed in the results section 510 and makes it easier for the user to determine when the needed topics have been found.

As described above, in one embodiment the search results 410 window provides the user with tools necessary to add or remove topics from the search results 410. The user may add locally stored video, text, or other media, or may reference media stored on a different computer on a network (such as the internet). Similarly, the user may remove topics that are not of interest or use to the user.

Figure 6:
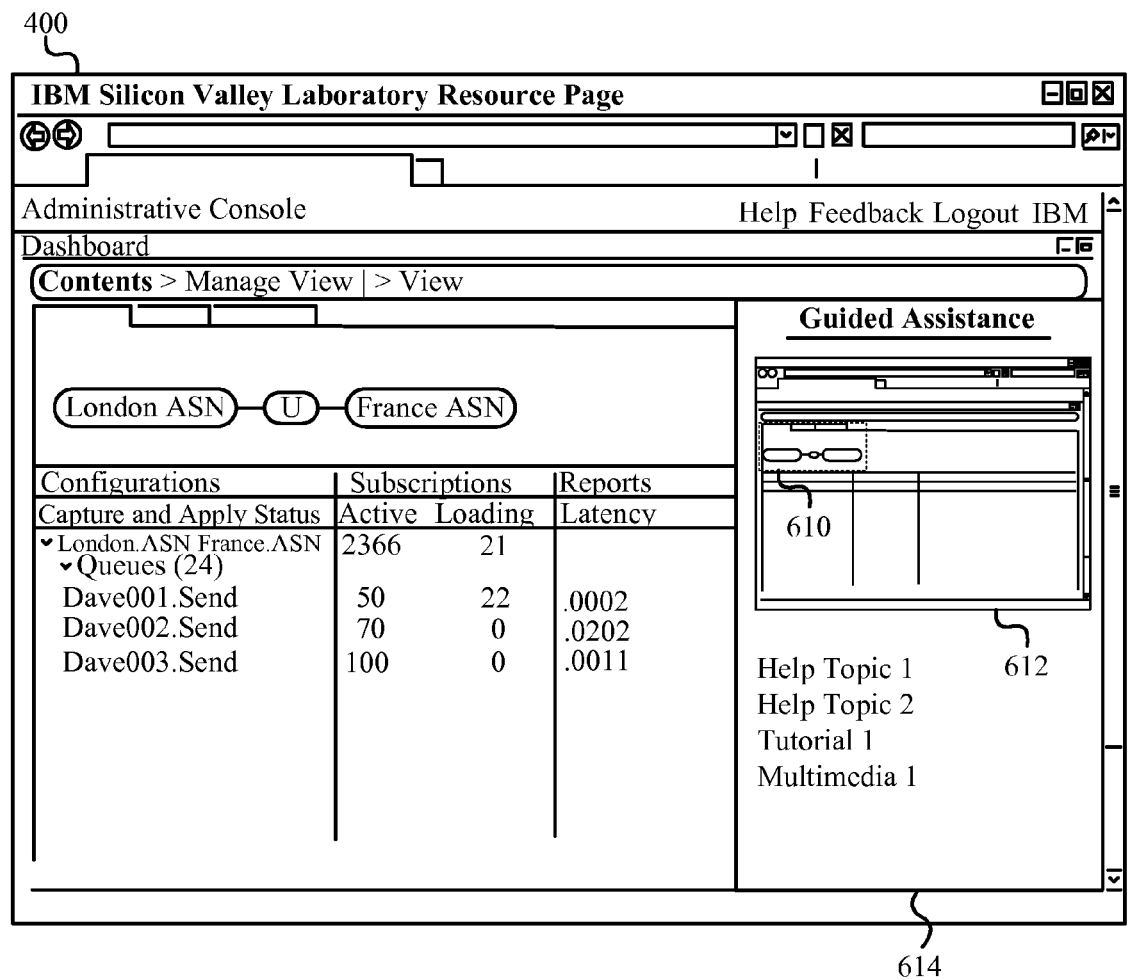
FIG. 6 is a third example of a computer application having visual contextual search capability in accordance with the present invention.

FIG. 6 shows another embodiment of a computer application 400 that provides visual contextual search. The computer application 400 includes a guided assistance feature 614 that incorporates into it the search results. The guided assistance feature shows a miniature 612 of the computer application 400. The user utilizes this miniature 612 to perform visual search. In one embodiment, the miniature 612 is a thumbnail image of the computer application 400. The miniature 612 may also be an alternative representation of the computer application 400 known to those of skill in the art that allows the user to select portions of interest.

Figure 5:
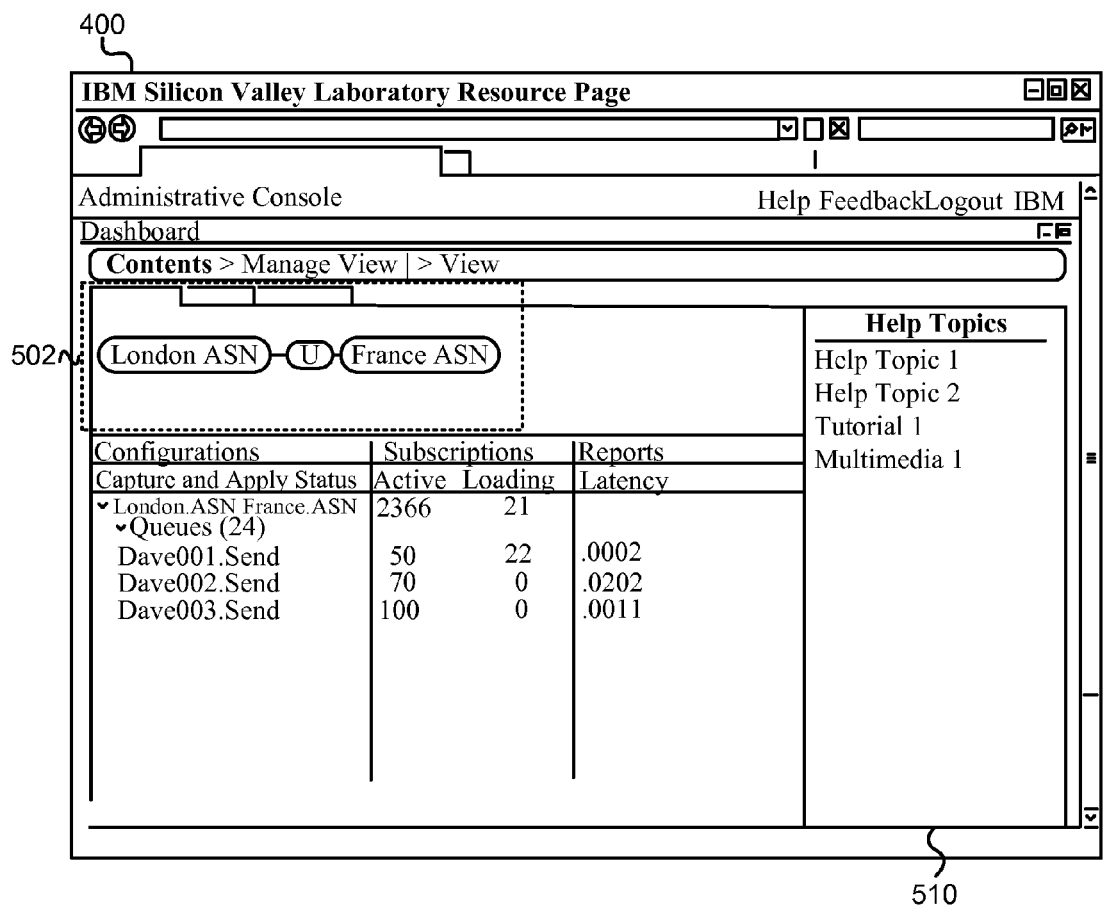
FIG. 5 is a second example of a computer application having visual contextual search capability in accordance with the present invention.

For example, the user may indicate a selection area 610 on the miniature 612. The selection area 610 is the equivalent on the miniature 612 as the selection area 502 shown in FIG. 5. As a result, the associated topics are displayed in the guided assistance feature 614. The user may add and remove topics from the guided assistance feature 614 as described above.

Figure 7:
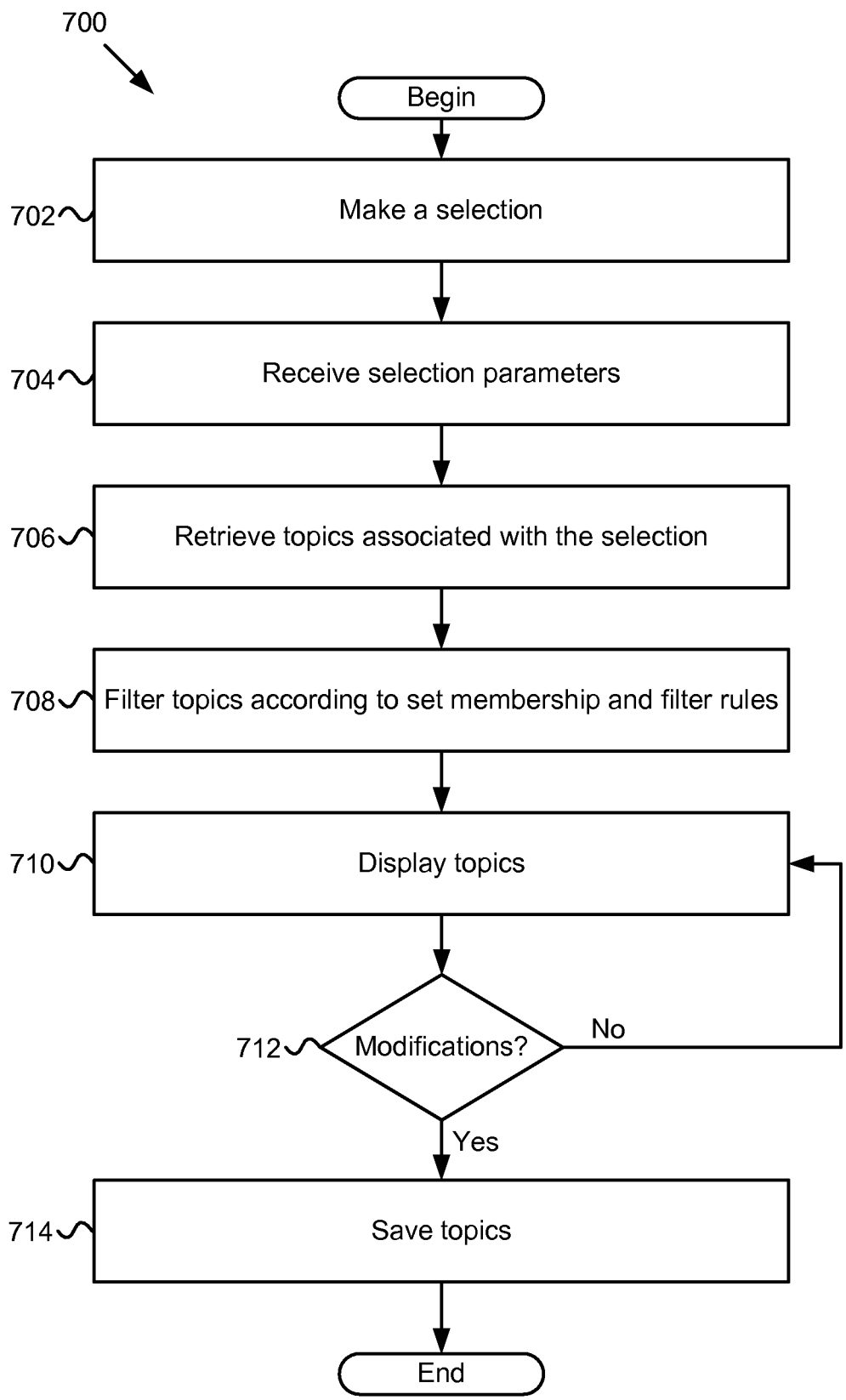
FIG. 7 is a schematic flow chart diagram illustrating a method for implementing visual contextual search in accordance with the present invention.

FIG. 7 is a schematic flow chart diagram showing one embodiment of a method 700 for performing visual contextual search in accordance with the present invention. Those of skill in the art will appreciate that the method 700 is exemplary and that the method is not intended to be limited to a particular order, and that one or more additional steps may necessary. Similarly, fewer steps may be necessary to perform substantially the same steps.

The method begins with a user making 702 a selection from the computer application GUI. The user's selection defines an area of the screen and particular GUI elements about which the user desires more information. The user makes this selection using an input device such as a mouse, keyboard, or other input devices known to those in the art. When the user makes the selection, the selection module 210 receives 704 the selection parameters that define the selection area chosen by the user. Selection parameters may include, for example, x-y coordinates defining four corners of the area selected by the user.

The topic module 212 then retrieves 706 those topics that are associated with the selection made by the user. In one embodiment, the topic module 212 uses a visual map 216 to determine which topics are associated with the selection area that the use defines. A context module 218 then filters 708 the set of associated topics based on set membership and one or more filter rules that were programmatically defined in advance. In another embodiment, the user may define and create additional filter rules for the context module 218.

The display module 214 then displays 710 those topics that are associated with the selection area and which are not filtered out by one or more filter rules in the context module 218. The display module 214 may display the topics in a separate, specified area of the GUI such as a side bar, in a pop-out window, or other display areas known to those in the art.

The modification module 220 monitors for and determines 712 whether changes are made to the displayed topics. The modification module 220, in one embodiment, helps the user add new topics to the displayed topics. The modification module 220 may also help the user remove topics from the displayed topics.

In one embodiment, if the modification module 220 determines that a change has been made, the save module 222 saves 714 the altered list of displayed topics to non-volatile memory such that the user can access the list at a later time. The save module 222 may also be configured to save the altered list only if the user approves or initiates the save operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising executable instructions stored in computer readable storage media for visual contextual searching, the computer program product comprising:
   a selection module configured to receive a selection area with user-defined boundaries encompassing one or more graphical user interface (GUI) elements of a GUI, wherein the one or more GUI elements provide one or more functions in response to being selected by a user, and, wherein the selection area is drawn by a user of the GUI while the GUI is running;
   a topic module configured to determine a set of help topics that provide instruction for use of the one or more GUI elements within the selection area defined by the user; and
   a display module configured to display for the user, on the computer display, a results section and a visual map of the GUI, the results section comprising one or more help topics in the set of help topics associated with the selection area defined by the user and the visual map of the GUI defining an association between the one or more help topics and the one or more GUI elements.

2. The computer program product of claim 1, wherein the topic module determines the set of topics by identifying the topics associated with the one or more GUI elements that are located in a portion of the visual map corresponding to the selection area.

3. The computer program product of claim 1, further comprising a context module configured to determine which of the one or more topics the display module displays for the user in the results section based on membership in the set of topics associated with the selection area and at least one filter rule.

4. The computer program product of claim 1, wherein the one or more help topics displayed by the display module include one or more of a topic name, a link, and a topic description.

5. The computer program product of claim 1, further comprising a modification module configured to associate topics with an area of the GUI in response to the user adding a topic to the results section, and that disassociates a topic with an area of the GUI in response to the user removing a topic from the results section.

6. The computer program product of claim 1, further comprising a save module configured to save as a list in non-volatile memory the one or more help topics displayed in the results section, the save module further configured to allow the user to access the list.

7. The computer program product of claim 1, wherein the modules are implemented in one of an internet browser, a computer software application, and a plug-in component configured for incorporation into one or more compliant computer software applications.

8. A computer-implemented method to enable a visual contextual search, the method comprising:
   receiving a selection area with user-defined boundaries encompassing a portion of a graphical user interface (GUI) of a computer application, wherein the selection area is drawn by a user of the GUI while the GUI is running;
   determining a set of help topics that are related to one or more GUI elements of the GUI that are displayed within the selection area defined by the user; and
   displaying for the user on the computer display a results section comprising one or more help topics in the set of help topics associated with the selection area defined by the user and a visual map of the GUI defining an association between the one or more help topics and the one or more GUI elements.

9. The method of claim 8, wherein determining a set of help topics that are related to one or more GUI elements comprises identifying one or more help topics associated with the GUI elements as defined by a visual map of the GUI.

10. The method of claim 8, further comprising filtering the one or more help topics the display module displays for the user based on membership in the set of help topics associated with the selection area and one or more filter rules.

11. The method of claim 8, further comprising associating help topics with an area of the GUI in response to the user adding a help topic to the results section, and for disassociating a help topic with an area of the GUI in response to the user removing a help topic from the results section.

12. The method of claim 8, further comprising saving in non-volatile memory the topics displayed in the results section, and for allowing the user to access the list.

13. The method of claim 8, wherein instructions for implementing the method are received from a remote server and instantiated in local memory of a computer executing the instructions.

14. A system for visual contextual search, the system comprising:
   a computer application having a graphical user interface (GUI) that is displayed to a user on a computer display;
   a visual map of the GUI that associates one or more topics with one or more GUI elements of the GUI; and
   a visual contextual search component comprising:
      a selection module configured to receive a selection area with user-defined boundaries encompassing a portion of the GUI of the computer application, wherein the selection area is drawn by a user of the GUI using a computer input device while the GUI is running;
      a topic module that determines, based on the visual map, a set of help topics that are related to the one or more GUI elements that are displayed within the selection area defined by the user; and
      a display module that displays for the user on the computer display a results section comprising one or more help topics in the set of help topics associated with the selection area defined by the user and a visual map of the GUI defining an association between the one or more help topics and the one or more GUI elements.

15. The system of claim 14, wherein the visual context search component further comprises a modification module configured to associate and disassociate help topics with an area of the GUI in response to the user adding or removing help topics from the results section on the computer display.

16. The system of claim 14, the visual context search component further comprising an update module configured to receive over a network a new topic related to the program and one or more locations on the visual map for the new topic.

17. The system of claim 14, wherein the visual contextual search component is a plug-in for the computer application having the GUI.

18. The system of claim 14, wherein the computer input device is one of a mouse, a touchscreen tool, and a keyboard.

19. The system of claim 14, wherein the computer application is configured to operate on one of a server, a desktop computer, and a mainframe computer.

20. An apparatus for performing a visual contextual search, the apparatus comprising:

a computer readable storage media storing a computer readable program executable by a processor;

a selection module that receives a selection area with user-defined boundaries encompassing a portion of a graphical user interface (GUI) of a computer application, wherein the selection area is drawn by a user of the GUI while the GUI is running, wherein the selection area encompasses one or more GUI elements of the GUI about which the user desires more information;

a topic module configured to determine a set of help topics that are related to the one or more GUI elements within the selection area using a visual map, wherein the visual map associates one or more help topics with one or more GUI elements of the GUI; and a display module that displays a results section and a visual map of the GUI for the user, wherein the results section includes one or more topics in the set of topics determined by the topic module to be related to the one or more GUI elements within the selection area and the visual map of the GUI defines an association between the one or more help topics and the one or more GUI elements.

21. The apparatus of claim 20, further comprising a modification module that associates help topics with an area of the GUI in response to the user adding a help topic to the results section, and that disassociates a help topic with an area of the GUI in response to the user removing a help topic from the results section.

22. The apparatus of claim 21, wherein an update module sends a help topic and information associating the help topic to one or more GUI elements to a remote server in response to the modification module associating the help topic with the area of the GUI.

23. The apparatus of claim 21, wherein a help topic disassociated with an area of the GUI is removed only from a list of help topics stored locally.

* * * * *